(12) United States Patent
Shibata

(10) Patent No.: US 7,698,978 B2
(45) Date of Patent: Apr. 20, 2010

(54) CUTTING DEVICES

(75) Inventor: Yoshinori Shibata, Anjo (JP)

(73) Assignee: Makita Corporation, Anjo-shi (JP)

( * ) Notice: Subject to any disclaimer, the term of this patent is extended or adjusted under 35 U.S.C. 154(b) by 0 days.

(21) Appl. No.: 12/379,416

(22) Filed: Feb. 20, 2009

(65) Prior Publication Data
US 2009/0158906 A1 Jun. 25, 2009

Related U.S. Application Data

(62) Division of application No. 11/519,942, filed on Sep. 13, 2006, now abandoned.

(30) Foreign Application Priority Data

Sep. 15, 2005 (JP) .............................. 2005-268614

(51) Int. Cl.
*B27G 19/00* (2006.01)
(52) U.S. Cl. .................. 83/102.1; 83/477.2; 83/544; 83/478; 83/DIG. 1
(58) Field of Classification Search ............... 83/102.1, 83/478, 477.2, 544, 520, 581, 477, DIG. 1; 144/251.1, 251.3, 286.5, 287, 253.3
See application file for complete search history.

(56) References Cited

U.S. PATENT DOCUMENTS

| 2,007,887 | A | | 7/1935 | Tautz | |
|---|---|---|---|---|---|
| 2,095,330 | A | * | 10/1937 | Hedgpeth | 83/102.1 |
| 2,352,235 | A | * | 6/1944 | Tautz | 83/102.1 |
| 2,786,496 | A | | 3/1957 | Eschenburg | |
| 4,615,247 | A | * | 10/1986 | Berkeley | 83/102.1 |
| 4,625,604 | A | * | 12/1986 | Handler et al. | 83/102.1 |
| 5,230,269 | A | | 7/1993 | Shiotani et al. | |
| 5,979,523 | A | | 11/1999 | Puzio et al. | |
| 6,170,370 | B1 | | 1/2001 | Sommerville | |
| 6,405,624 | B2 | | 6/2002 | Sutton | |
| 6,840,144 | B2 | | 1/2005 | Huang | |
| 7,210,386 | B1 | | 5/2007 | Chang | |
| 7,302,878 | B2 | | 12/2007 | Chang | |
| 7,437,981 | B2 | * | 10/2008 | Burke et al. | 83/102.1 |
| 2004/0011177 | A1 | | 1/2004 | Huang | |
| 2005/0211034 | A1 | * | 9/2005 | Sasaki et al. | 83/102.1 |
| 2006/0042441 | A1 | | 3/2006 | Ichikawa et al. | |
| 2006/0053993 | A1 | | 3/2006 | Wong | |
| 2006/0260456 | A1 | * | 11/2006 | Chang | 83/477.2 |

FOREIGN PATENT DOCUMENTS

| EP | 1 491 304 A2 | 12/2004 |
|---|---|---|
| JP | U-03-042602 | 4/1991 |
| JP | U-06-046901 | 6/1994 |

* cited by examiner

*Primary Examiner*—Boyer D Ashley
*Assistant Examiner*—Bharat C Patel
(74) *Attorney, Agent, or Firm*—Oliff & Berridge, PLC

(57) ABSTRACT

A cutting including a saw blade protruding from an upper surface of the table can include a splitter positioned on the front side with respect to a cutting direction of the saw blade and in alignment with the saw blade. A guard device is provided for covering the saw blade. A kickback preventing claw member prevents the workpiece from being forced upward by the saw blade after the workpiece has been cut by the saw blade. A mount frame is detachably mounted to an upper portion of the splitter. The guard device and the kickback preventing claw member are supported on the mount frame, so that the guard device and the kickback preventing claw can be removed separately or together from the splitter.

8 Claims, 11 Drawing Sheets

CUTTING DEVICES

BACKGROUND OF THE INVENTION

1. Field of the Invention

This is a Divisional of application Ser. No. 11/519,942, filed Sep. 13, 2006. This application claims priority to Japanese patent application serial number 2005-268614, the contents of which are incorporated herein by reference.

The present invention relates to cutting devices, and in particular to table saws having a table for placing workpieces thereon and a saw blade partially protruding upward from the upper surface of the table.

2. Description of the Related Art

Table saws have a table for placing workpieces thereon and a circular saw blade that partially protrudes upward from the upper surface of the table, so that workpieces may be cut by moving workpieces along the upper surface of the table toward the saw blade in a direction parallel to the surface of the saw blade. It has been known to provide a guard device in order to prevent potential interference of the other articles with the upper portion of the saw blade protruding from the table surface. The known guard device has a guard plate that is configured to cover the saw blade primarily from right and left sides and the upper side. The guard device is configured such that the guard plate is moved upward or opened by the workpiece as the workpiece moves toward the saw blade. Typically, the guard plate is vertically pivotally mounted to a splitter.

For the convenience of change of the saw blade, there has been proposed to configure the guard device such that the guard plate can not only vertically pivot but also can be completely removed. Japanese Laid-Open Utility Model Publication No. 646901, U.S. Pat. No. 6,405,624 and EP 1491.304 A2 teach known guard devices.

In general, a saw blade of the table saw rotates in such a direction that the saw blade moves downward on the side of the position of the workpiece before it is cut (hereinafter called "front side with respect to cutting direction"), while the saw blade moves upward on the side of the position of the workpiece after it has been cut (hereinafter called "rear side with respect to cutting direction"). Therefore, if the cut surfaces of the workpiece contact the rear side of the rotating saw blade immediately after the workpiece has been cut, the workpiece may be forced upward by the rotating saw blade in some occasion. This phenomenon is called "kickback phenomenon." When this phenomenon occurs, it is difficult to smoothly perform the cutting operation. Therefore, there has been proposed to position a splitter (also called "riving knife") having substantially the same thickness as the saw blade on the rear side of the saw blade and within the same plane as the saw blade. The splitter may enter the cut of the workpiece and maintain the cut width of the workpiece in order to avoid contact of the rotating saw blade with the cut surfaces. In addition, in order to prevent the potential kickback phenomenon, there has been proposed to provide kickback preventing claw members on opposite sides of the splitter within a region where the kickback preventing claw members may not interfere with the movement of the workpiece in the cutting direction. Japanese Laid-Open Utility Model Publication No. 3-42602 and U.S. Pat. No. 6,405,624 teach known kickback preventing claw members.

Also there has been proposed to provide a splitter and kickback preventing claw members for preventing the kickback phenomenon in addition to a guard device for preventing interference of other articles with the saw blade. In this structure, a guard plate of the guard device and kickback preventing claw members are respectively vertically pivotally supported on the upper portion of the splitter.

However, for example, in the case of the cutting operation of a decorative laminated sheet, it would be preferable that the kickback preventing claw members will not contact the sheet during the cutting operation. Therefore, by configuring the kickback preventing claw members to be able to be removed from the splitter, the operability for this kind of cutting operation can be improved. In addition, the operation for changing the saw blade can be conveniently performed if the kickback preventing claw members are removed from the splitter in order to keep the kickback preventing claw members as far away from the saw blade as possible.

In this structure, the guard plate of the guard device and each of the kickback preventing claw members are individually supported on the splitter. In this configuration, a problem occurs such that the mounting and removing operations of the guard plate and the kickback preventing claw members are very difficult when such operations are necessary for changing the saw blade.

SUMMARY OF THE INVENTION

One embodiment of the present invention is an improved cutting device constructed to reduce potential troubles in performing the operations for removing a guard device and a kickback preventing claw member from a splitter.

In another embodiment of the present invention, cutting devices are taught that include a table for placing a workpiece thereon, and a saw blade protruding from an upper surface of the table. A splitter positioned on the front side with respect to a cutting direction of the saw blade and in alignment with the saw blade. A guard device is provided for covering the saw blade. A kickback preventing claw member prevents the workpiece from being forced upward by the saw blade after the workpiece has been cut by the saw blade. A mount frame is detachably mounted to an upper portion of the splitter. The guard device and the kickback preventing claw member are supported on the mount frame, so that the guard device and the kickback preventing claw can be removed together from the splitter.

DETAILED DESCRIPTION OF THE INVENTION

Each of the additional features and teachings disclosed above and below may be utilized separately or in conjunction with other features and teachings to provide improved cutting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
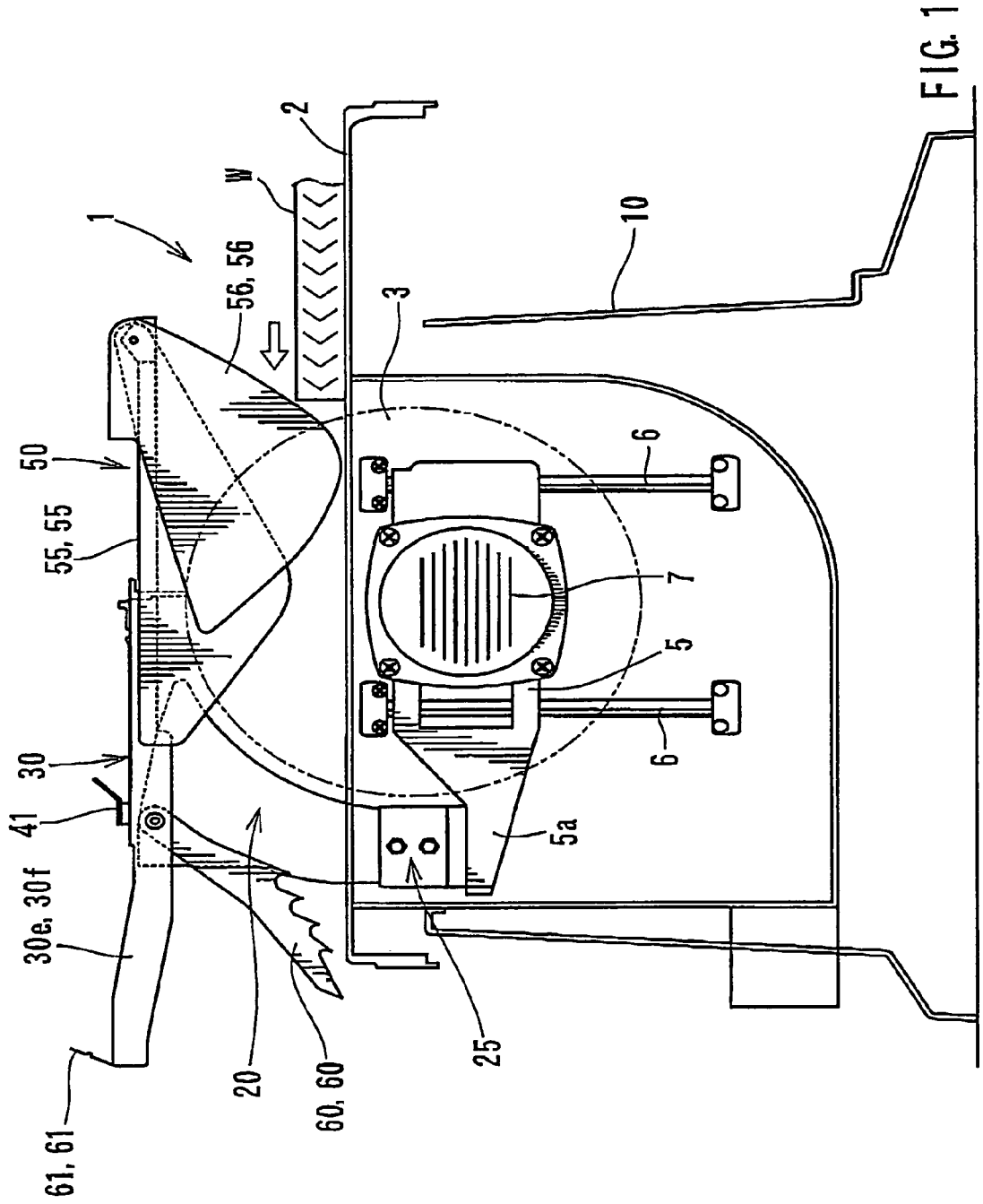
FIG. 1 is a side view of a table saw according to one embodiment of the present invention.

Various embodiments of the present invention will now be described with reference to FIGS. 1 to 15. The FIG. 1 shows an overall view of a cutting device 1 according to one embodiment. In this embodiment, the cutting device 1 is embodied as a table saw. The cutting device 1 is characterized in a support structure for supporting kickback preventing claw members 60 and a guard device 50.

Referring to FIG. 1, a table 2 is supported substantially horizontally by a base structure 10. A circular saw blade 3 is positioned substantially centrally of the table 2 and has an upper portion extending from the upper surface of the table 2. The saw blade 3 is supported by a lift base 5 disposed below the table 2 so as to be rotatably driven by an electric motor 7. The lift base 5 is slidably supported by vertical rods 6 that are mounted on the base structure 10, so that the lift base 5 can move in parallel in the vertical direction. By vertically moving the lift base 5, it is possible to change the protruding distance of the upper portion of the saw blade 3 from the upper surface of the table 2. In other words, it is possible to change the cutting depth of the saw blade 3 into a workpiece W.

The workpiece W can be cut as it is moved in a direction indicated by an outline arrow (hereinafter called "cutting direction") along the upper surface of the table 2. A splitter 20 is disposed on the front side (left side as viewed in FIG. 1) of the saw blade 3 with respect to the cutting direction. The splitter may be also called "riving knife."

The splitter 20 is made of a flat plate having a thickness substantially equal to the thickness of the saw blade 3 and is positioned within the same plane as the saw blade 3. The splitter 20 is mounted on a base portion Sa of the lift base 5 via a mount base 25 in such a manner that the upper portion of the splitter 20 protrudes upward from the upper surface of the table 2. The splitter 20 is adapted to enter the cut just after the cut has been formed in the workpiece W in order to keep the cut width constant. Therefore, opposite cut surfaces are prevented from contacting with the rotating saw blade 3, so that a phenomenon called "kickback phenomenon" can be avoided.

The kickback preventing claw members 60 and the guard device 50 are mounted to the upper end of the splitter 20, which protrudes upward from the upper surface of the table 2, via a mount frame 30. The mount frame 30 and the guard device 50 are shown in detail in FIGS. 2 to 9.

Figure 2:
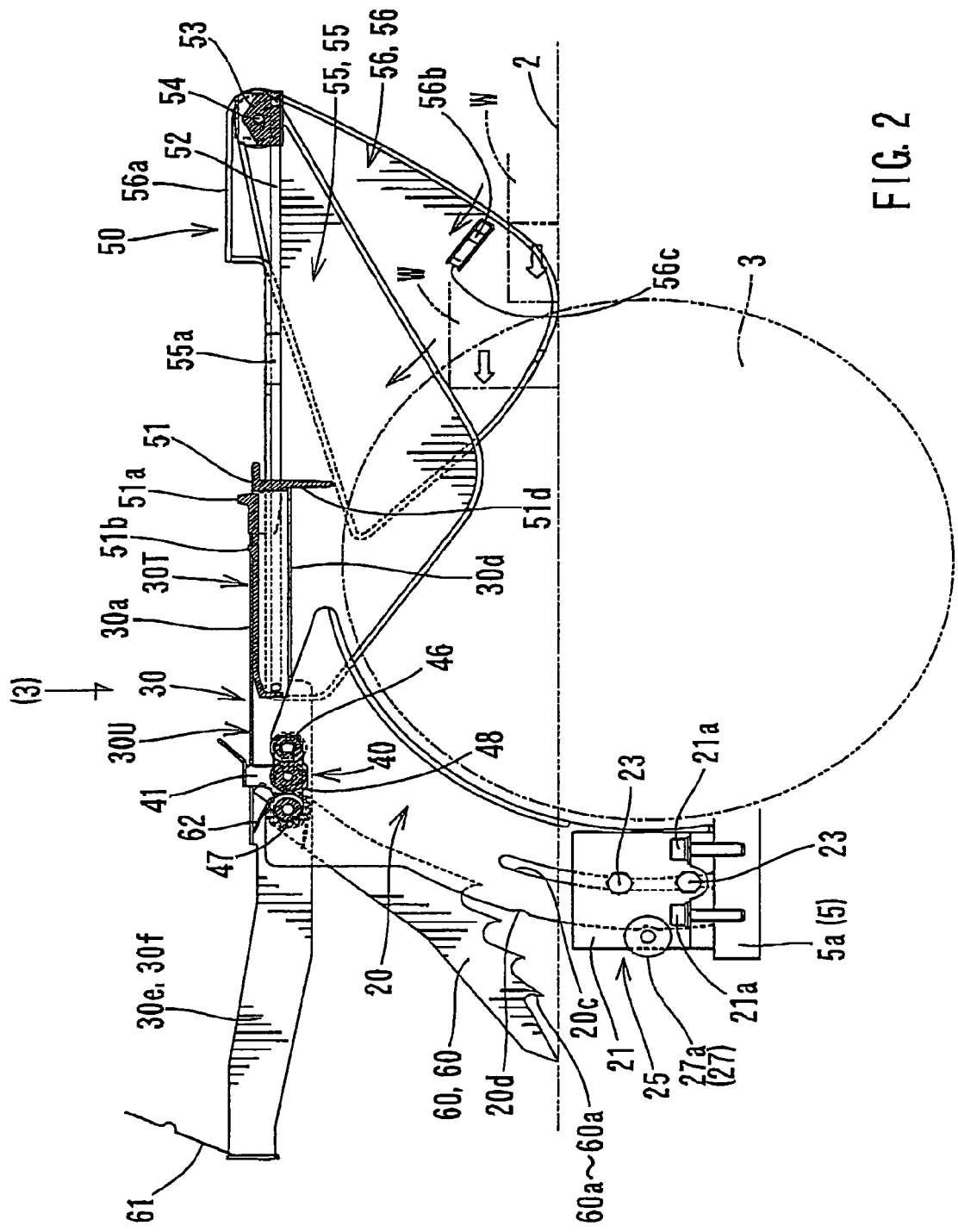
FIG. 2 is an enlarged side view of a portion around a saw blade of the table saw.

The mount frame 30 includes a tubular portion 30T disposed on the rear side thereof with respect to the cutting direction (left side as viewed in FIG. 2). The tubular portion 30T has a rectangular cross section and includes a top part 30a, a left part 30b, a right part 30c and a bottom part 30d. The top part 30a, the left part 30b and the right part 30c extend forwardly with respect to the cutting direction to form an inverted U-shape portion 30U. The left and right parts 30b and 30c further extend forwardly to form protection arms 30e and 30f that are parallel to each other. The front ends of the protection arms 30e and 30f are joined to each other via a joint, to which two claw-retaining springs 61 are attached. The function of the claw-retaining springs 61 will be described later.

Figure 7:
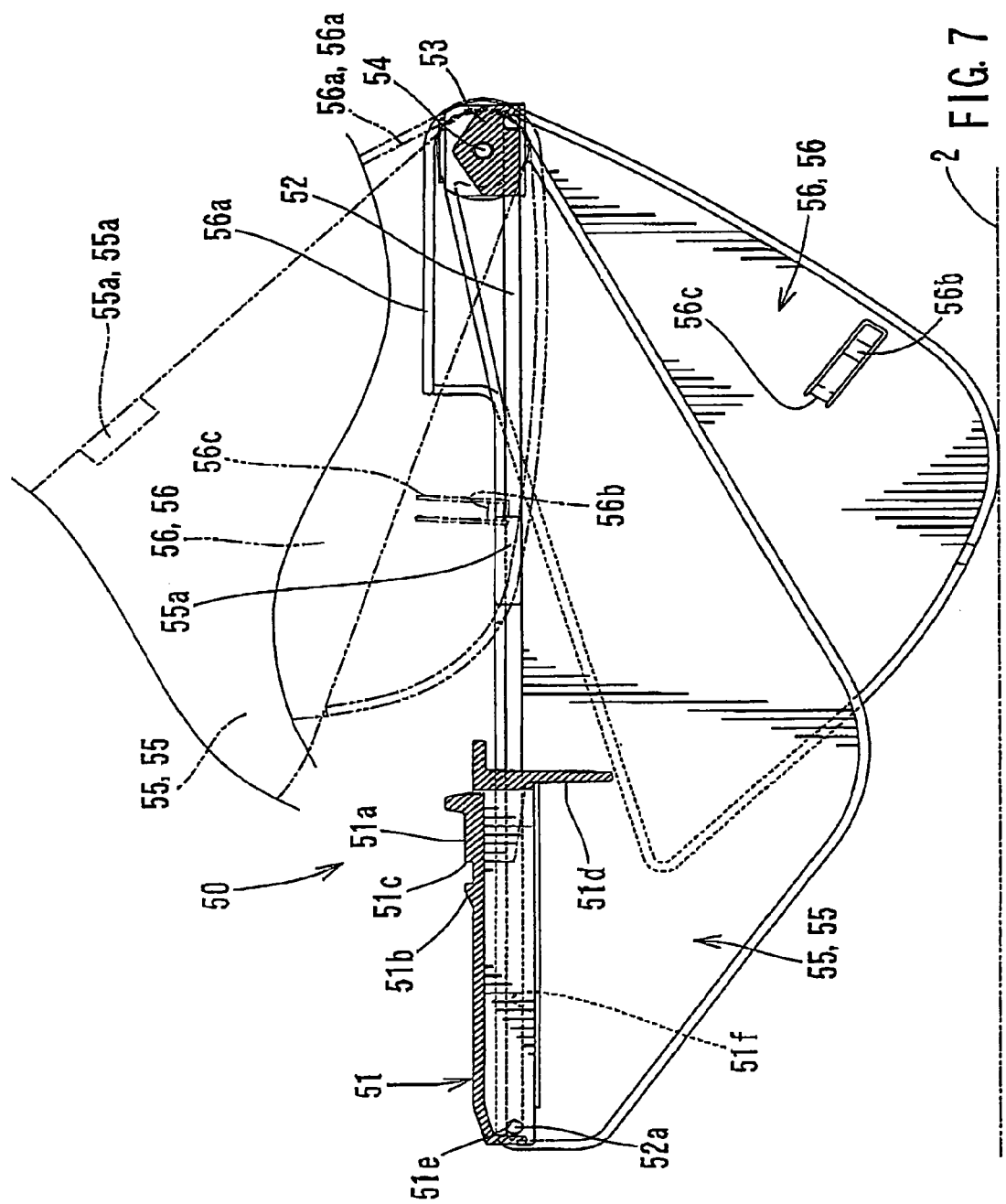
FIG. 7 is a side view of the guard device after removal from the mount frame.

The guard device 50 is removably mounted to the tubular portion 30T of the mount frame 30 configured as described above. The guard device 50 in the removed state from the tubular portion 30T is shown in FIG. 7. The guard device 50 has a mount holder 51 insertable into the tubular portion 30T, a guard frame 52 extending rearwardly with respect to the cutting direction from the mount holder 51 (rightward as viewed in FIG. 7), a guard holder 53 disposed at the front end of the guard frame 52, a pair of right and left first guard plates 55 and a pair of right and left second guard plates 56. The first guard plates 55 and the second guard plates 56 are vertically pivotally supported by the guard holder 53 via a support rod 54.

Figure 4:
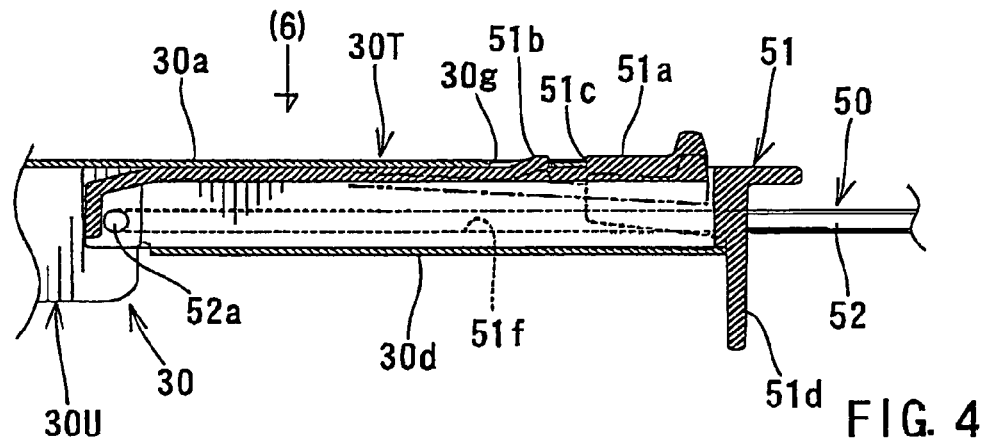
FIG. 4 is a vertical sectional view showing the state where a mount holder of a guard device has been inserted into a mount frame.

As shown in FIGS. 4 to 7, the mount holder 51 has a substantially rectangular parallelepiped hollow configuration and is insertable into the tubular portion 30T without producing substantial clearance. Preferably, the mount holder 51 is manufactured into one piece by a molding process of a synthetic resin. A removing operation lever 51a is vertically movably disposed on the upper portion of the mount holder 51. The removing operation lever 51a is molded integrally with the upper portion of the mount holder 51 while the removing operation lever 51a being delimited from the upper portion of the mount holder 51 by a cut line. Because the removing operation lever 51a is made of a synthetic resin same as the mount holder 51, the removing operation lever 51a has a resiliency in the vertical direction. When in the state where no load is applied to the removing operation lever 51a, the removing operation lever 51a is held to extend substantially flush with the upper portion of the mount holder 51 as shown in FIG. 4. When a load is applied to press the removing operation lever 51a downward, the removing operation lever 51a may pivot downward due to the resilient deformation of its base end joined to the upper portion of the mount holder 51. When the pressing force has been released, the removing operation lever 51a resiliently recover the position to extend substantially flush with the upper portion of the mount holder 51.

An insertion preventing stop 51c and a removal preventing stop 51b are formed integrally with the upper surface of the removing operation lever 51a. As shown in FIG. 4, the mount holder 51 is inserted into the tubular portion 30T of the mount frame 30, the insertion preventing stop 51c may engage with the rear end of the top part 30a defining the rear opening of the tubular portion 30T, so that no further inserting movement of the mount holder 51 may be restricted. In addition, in this inserted position, the removal preventing stop 51b may enter and engages a stop hole 30b formed in the top part 30a of the tubular portion 30T, so that the mount holder 51 may be prevented from being removed from the tubular portion 30T. In this way, it is possible to maintain the mounted state of the guard device 50 to the mount frame 30.

Figure 5:
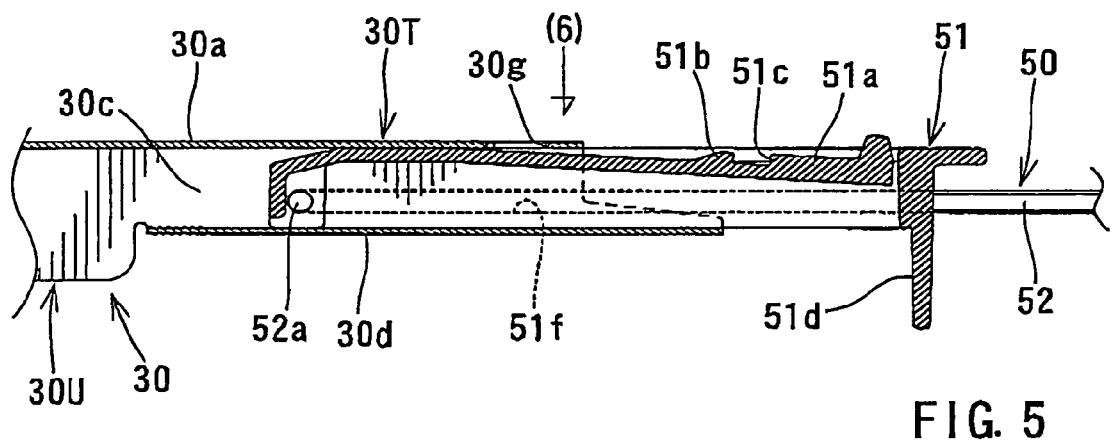
FIG. 5 is a vertical sectional view similar to FIG. 4 but showing the state where the mount holder is being removed from the mount frame.
Figure 6:
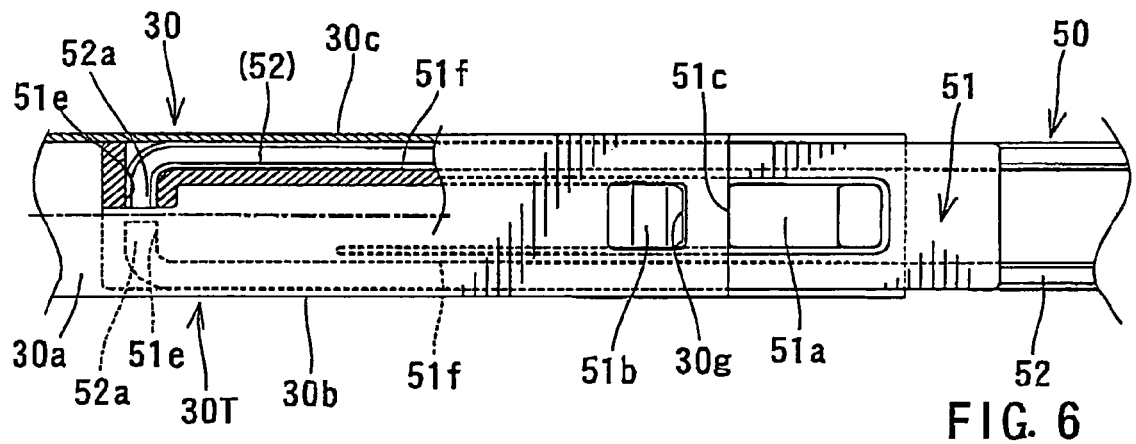
FIG. 6 is a plan view as viewed from a direction indicated by an arrow (6) in FIG. 4.

When the removing operation lever 51a has been pressed downward, the removal preventing stop 51b moves downward so as to be removed from the stopper hole 30b, so that the mount holder 51 can be removed from the tubular portion 30T as shown in FIG. 5. With the mount holder 51 removed from the tubular portion 30T, it is possible to remove the guard device 50 from the mount frame 30.

A stop wall 51d is formed on the rear end (right end as viewed in FIGS. 4 and 5) of the mount holder 51 and extends downward therefrom. When the mount holder 51 is in the mounted position shown in FIG. 4, the stop wall 51d substantially contacts the rear end of the bottom part 30d of the tubular portion 30T, so that the inserting movement of the mount holder 51 is restricted also by the stop wall 51d.

The mount holder 51 is fixedly attached to the front end of the guard frame 52. In other words, the guard frame 52 extends rearward from the mount holder 51. When the guard device 50 has been mounted to the mount frame 30 and eventually to the splitter 20, the guard frame 52 is held to horizontally extend rearward from the mount holder 51.

The guard frame 52 can be formed by a single round bar that is bent to have a substantially U-shape configuration elongated along the central axis of U-shape. Opposite ends 52a of the guard frame 52 are respectively inserted into and engaged with engaging holes 51e formed in the mount holder 51. In addition, the parallel leg portions of the guard frame 52 are respectively fitted into engaging recesses 51f that are formed in opposite sides of the mount holder 51 and extend in forward and rearward directions. With this arrangement, the guard frame 52 is fixed in position relative to the mount holder 51 in such a state that the guard frame 52 extends reward from the mount holder 51. A strip plate instead of a round bar may be bent into U-shape to form the guard frame 52.

Figure 3:
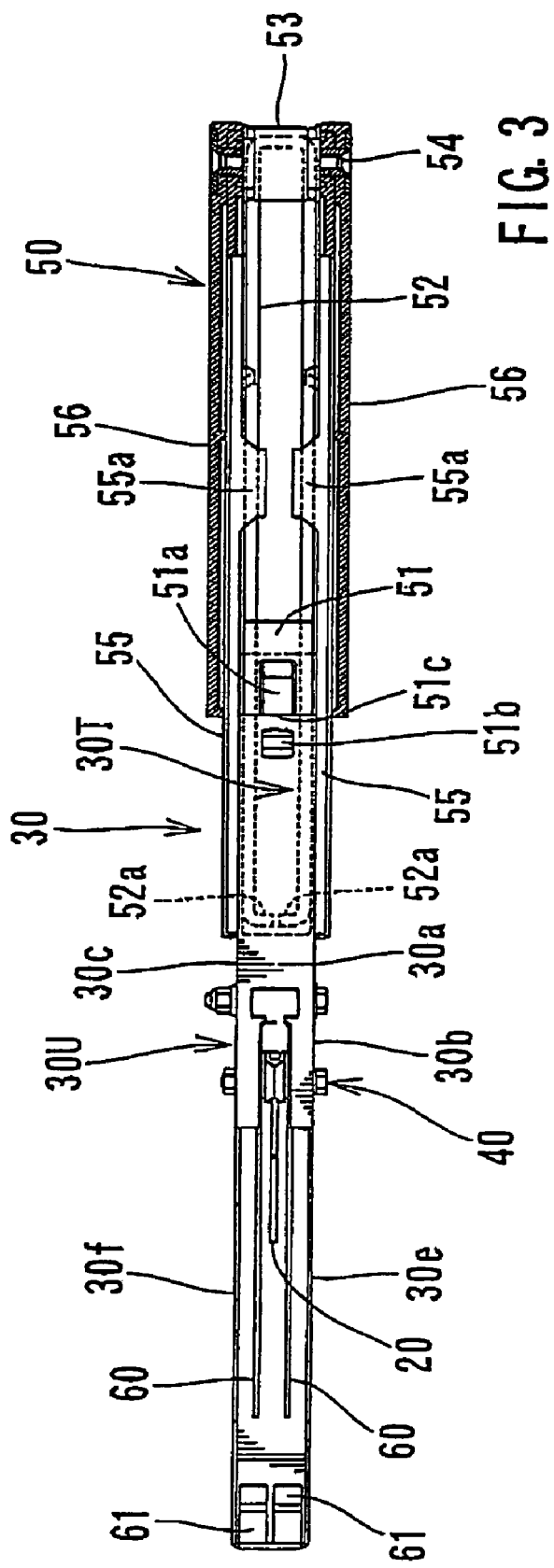
FIG. 3 is a plan view as viewed from a direction indicated by an arrow (3) in FIG. 2.

As shown in FIGS. 2, 3 and 7, the guard holder 53 can be held by the rear end (right end as viewed in FIG. 2) of the guard frame 52 so as to be fixed in position relative thereto. The guard holder 53 can include a support shaft 54 that has opposite ends extending laterally outward from the guard holder 53. The pair of the first guard plates 55 and the pair of the second guard plates 56 are vertically pivotally supported by the opposite ends of the support shaft 54. The first guard plates 55 are arranged symmetrically to each other. Also, the second guard plates 56 are arranged symmetrically to each other. The first and second guard plates 55 and 56 may serve to cover the saw blade 3 from opposite sides with respect to the lateral direction. More specifically, the second guard plates 56 are designed so as to lap over the respective first guard plates 55 from the laterally outer side.

Stopper edges 55a are respectively formed on the upper portions of the first guard plates 55 in substantially the central position along the forward and rearward directions (right and left directions as viewed in FIG. 7) and extend toward each other. As shown in FIG. 3, the stopper edges 55a can contact the guard frame 52 from its upper side in order to limit the lower pivotal stroke end of the first guard plates 55.

Similarly, stopper edges 56a are respectively formed on the upper portions of the second guard plates 56 in a position nearer to their pivotal axis and extend toward each other. The stopper edges 56a may contact the upper edges of the first guide plates 55 in order to limit the lower pivotal stroke end of the second guard plates 56 relative to the first guard plates 55.

In the state shown in FIG. 2, where the guard device 50 has been mounted to the splitter 20 but a workpiece W still has not been set on the table 2, the stopper edges 55a of the first guard plates 55 contact with the guard frame 52 from the upper side, so that the first guard plates 55 are positioned in the lower pivotal stroke end. In this lower pivotal stroke end, the first guard plates 55 do not contact the upper surface of the table 2, while the lower edges of the second guard plates 56 are in contact with the upper surface of the table 2. Therefore, the stopper edges 56a of the second guard plates 56 are not in contact with the upper edges of the first guard plates 55.

As the workpiece W is moved in the cutting direction after setting on the upper surface of the table 2, the front end of the workpiece W may force to pivot the second guard plates 56 upward. In other words, the second guard plates 56 are opened in order to permit movement of the work piece W. If the workpiece W has a relatively large thickness, the front end of the workpiece W may further force to pivot the first guard plates 55 upward to open the same. As described previously, the guard plates 55 and 56 can pivot about the support shaft 54 or pivot about the same axis.

Figure 8:
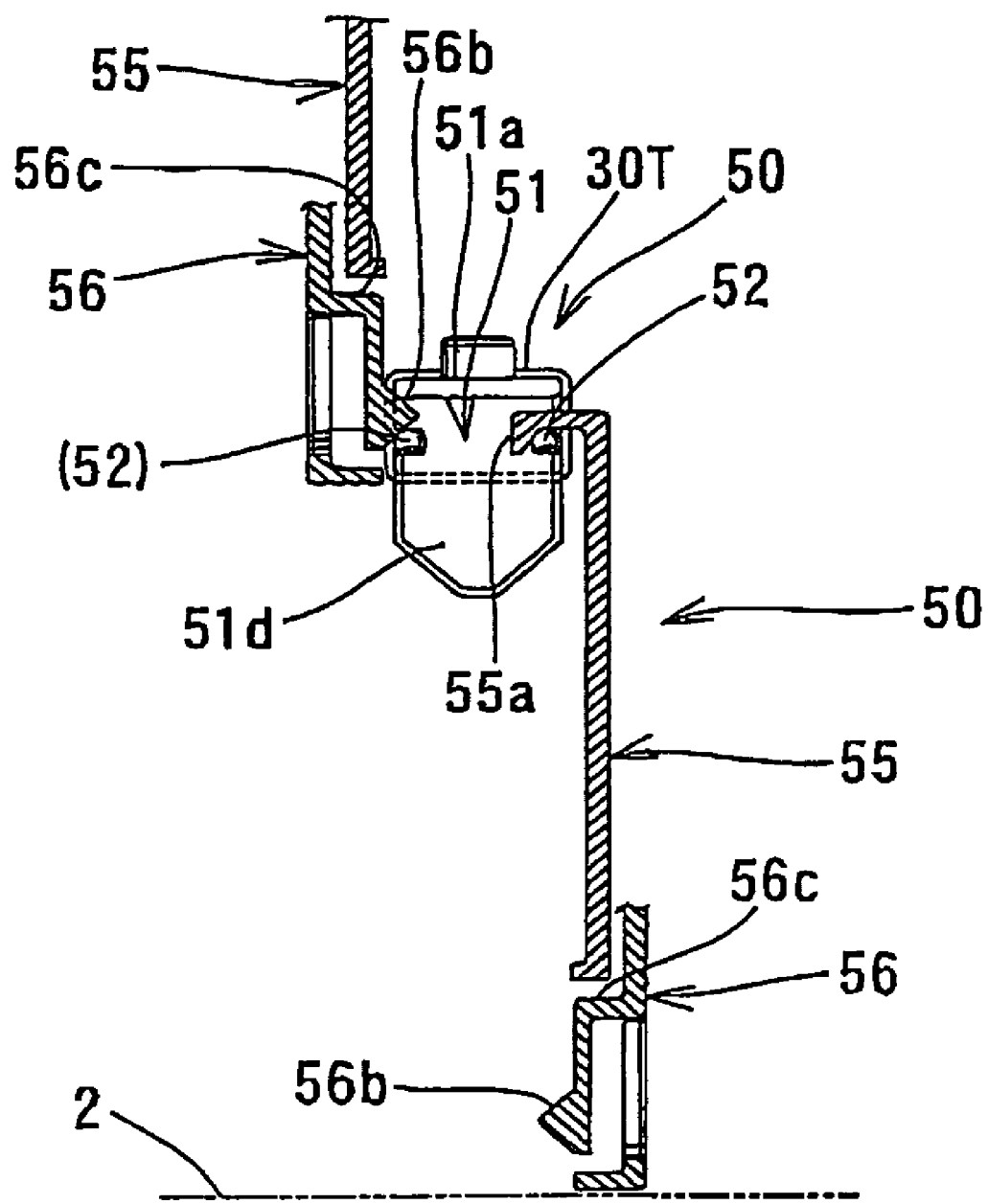
FIG. 8 is a rear view of the guard device with first and second guard plates shown in vertical sectional views.

In addition, as shown in FIGS. 7 and 8, a stopper projection 56b and an interlocking stepped portion 56c are formed on each of the second guard plates 56. When the second guard plates 56 have been pivoted upward by a predetermined angle, the interlocking stepped portions 56c engage the lower edges of the respective first guard plates 55. Therefore, as the second guard plates 56 further pivot upward by the movement of the workpiece W, the first guard plates 55 may pivot upward together with the second guard plates 56.

Further, if the operator manually pivots the second guard plates 56 upward together with the first guard plates 55 by a large angle greater than the predetermined angle, the stopper projections 56b can engage the respective leg portions of the guard frame 52 from the upper side by the resilient deformation of portion of the second guard plates 56 about the stopper projections 56b. With the stopper projections 56b thus engaged with the respective leg portions of the guard frame 52, the first and second guard plates 55 and 56 are temporarily held in fully opened positions. The fully opened positions are indicated by dashed-two dotted lines in FIG. 7.

Although the first guard plates 55 and the second guard plates 56 are provided in pairs in this embodiment, one first guard plate and one second guard plate can be provided, or three or more first guard plates and three or more second guard plates can be provided.

Figure 9:
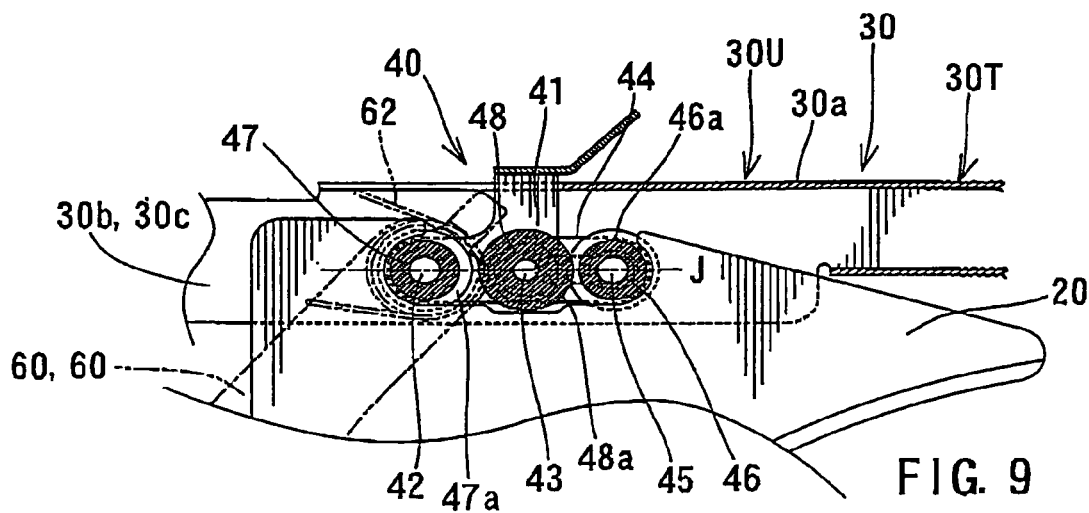
FIG. 9 is a side view of a mount mechanism and showing the state where a mount frame has been mounted to a splitter.
Figure 10:
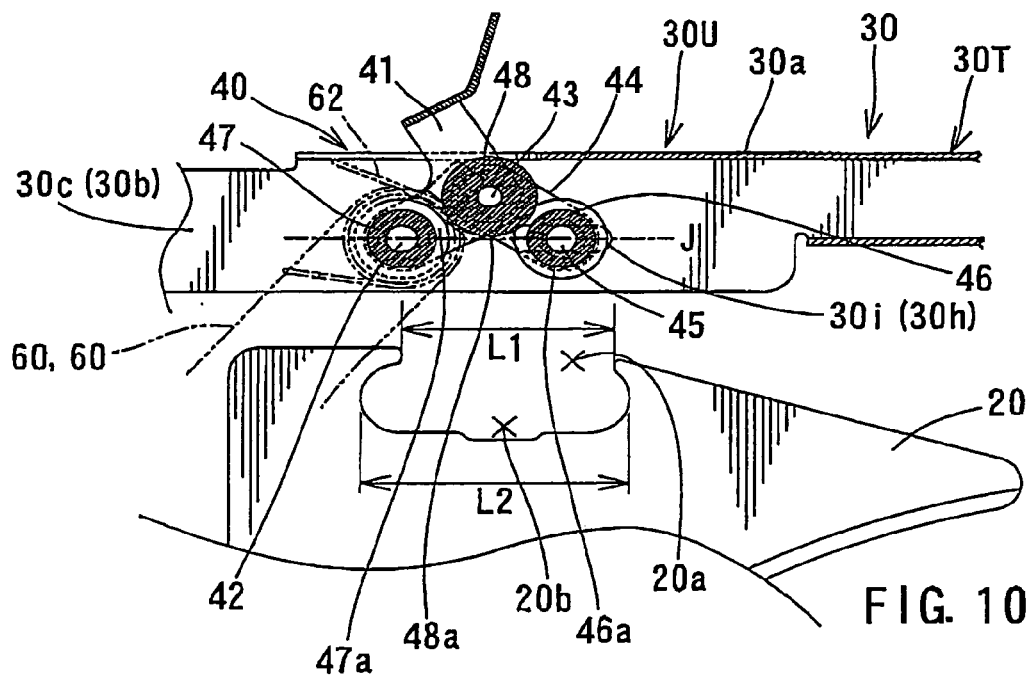
FIG. 10 is a side view similar to FIG. 9 but showing the state where the mount frame has been removed from the splitter.
Figure 11:
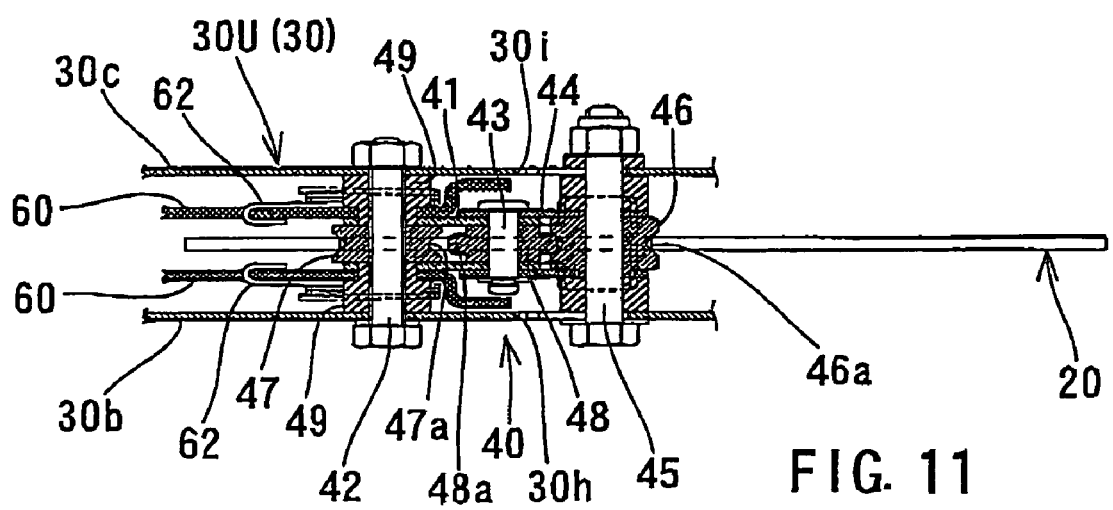
FIG. 11 is a horizontal sectional view of the mount mechanism.

A mount mechanism 40 can be disposed within the inverted U-shape portion 30U of the mount frame 30. As described previously, the U-shape portion 40U is positioned substantially centrally of the mount frame 30 with respect to the forward and rearward directions. The details of the mount mechanism 40 are shown in FIGS. 9 to 11. The mount mechanism 40 has a lever 41 that can be pivoted by the operator. The lever 41 is pivotally supported by a fixed shaft 42 that extends between the left part 30b and the right part 30c of the mount frame 30. The upper portion of the lever 41 extends upward through and beyond the top part 30a of the mount frame 30. In this embodiment, lever 41 is vertically pivotally supported by fixed shaft 42.

Also, a front engaging roller 47 is rotatably supported by the fixed shaft 42. A pivotal shaft 43 can be mounted to the lever 41 in a position away from its pivotal axis, so that the pivotal shaft 43 can be positioned away from the fixed shaft 42 by a predetermined distance. An intermediate engaging roller 48 can be rotatably supported by the pivotal shaft 43. One end of an arm 44 is vertically pivotally supported by the pivotal shaft 43. A shiftable shaft 45 can be attached to the other end of the arm 44. A rear engaging roller 46 is rotatably supported by the shiftable shaft 45.

Opposite ends of the shiftable shaft 45 are slidably inserted into control slots 30h and 30i that are respectively formed in the left part 30b and the right part 30c of the mount frame 30. The control slots 30h and 30i are elongated in forward and rearward directions, so that the shiftable shaft 45 can move together with rear engaging roller 46 in parallel in forward and rearward directions (left and right directions as viewed in FIGS. 9 to 11) along the control slots 30h and 30i within a predetermined range. As shown in FIG. 10, the fixed shaft 42 is positioned within a plane J, within includes the longitudinal axes of the control slots 30h and 30i.

Therefore, as the lever 41 pivots upward about the fixed shaft 42, the arm 44 pivots in a clockwise direction as viewed in FIG. 10 about the pivot shaft 43, so that the shiftable shaft 45 moves forward together with the rear engaging roller 46 along the control slots 30h and 30i. Therefore, the rear engaging roller 46 moves toward the front engaging roller 47.

On the contrary, as the lever 41 pivots downward about the fixed shaft 42, the arm pivots in a counterclockwise direction as shown in FIG. 9, so that the rear engaging roller 46 moves away from the front engaging roller 47. In addition, the intermediate engaging roller 48 moves downward to interleave between the front engaging roller 47 and the rear engaging roller 46 and may force the rear engaging roller 46 to move the same rearward. As the lever 41 is further pivoted downward, the pivotal shaft 43 supporting the intermediate engaging roller 48 moves across the plane J from a position above the plane J to a position slightly below the plane J. Then, the rear engaging roller 46 may be temporarily locked in a position that is away from the front engaging roller 47. The position of the lever 41 in this state will be hereinafter called "lock position." In this way, the plane J defines a dead point of the lock mechanism constituted by three engaging rollers 46, 47 and 48. The locking operation of these three engaging rollers 46, 47 and 48 by the operation of the lever 41 will be explained later.

Forcibly pivoting the lever 41 upward from the lock position may move the pivotal shaft 43 from the position below the plane J to a position above the plane J, so that the lock condition may be released and the rear engaging roller 46 can move toward the front engaging roller 47.

As shown in FIG. 11, a circumferential engaging recess 47a and a circumferential engaging recess 46a are respectively formed in the outer circumferential surfaces of the front engaging roller 47 and the rear engaging roller 46 throughout their circumferential lengths. Preferably, each of the engaging recesses 47a and 46a can have a substantially V-shape cross section and can have a maximum width that is slightly greater than the thickness of the splitter 20. A circumferential engaging projection 48a engageable with the circumferential recess 46a of the rear engaging roller 46 can be formed on the outer circumferential surface of the intermediate engaging roller 48. Preferably, the engaging projection 48a has a width that is substantially equal to the thickness of the splitter 20.

For cooperating with the mount mechanism 40 configured as described above, a first slot 20a and a second slot 20b can be formed in the upper portion of the splitter 20. The first slot 20a extends into the splitter 20 from the upper edge of the splitter 20 as shown in FIG. 10, so that the first slot 20a has an upper opening having a width L1 with respect to forward and rearward directions. The second slot 20b is formed in continuity with the lower portion of the first slot 20a and is elongated in forward and rearward directions, so that the second slot 20b has a width L2 that is greater than the width L1 (L2>L1).

As the lever 41 is pivoted upward to move the rear engaging roller 46 toward the front engaging roller 47, the distance between the front side portion of the front engaging roller 47 and the rear side portion of the rear engaging roller 46 may be reduced to be smaller than the width L1. Therefore, with the distance thus reduced, the front and rear engaging rollers 47 and 46 can enter the first slot 20a of the splitter 20 and further enter the second slot 20b. Then, the operator may pivot the lever 41 downward to move the rear engaging roller 46 away from the front engaging roller 47, so that the rear engaging roller 46 engages the rear end of the second slot 20b and the front engaging roller 47 engages the front end of the second slot 20b. As the lever 41 is further pivoted downward to the lock position, the intermediate engaging roller 48 presses the front and rear engaging rollers 47 and 46 against portions of the splitter 20, which define front and rear ends of the second slot 20b. As a result, the mount mechanism 40 can be held to be mounted to the splitter 20.

More specifically, in this lock condition, the distance between the front side portion of the front engaging roller 47 and the rear side portion of the rear engaging roller 46 is greater than the width L1 of the first slot 20a. Therefore, these engaging rollers 47 and 46 are restricted from moving through the first slot 20a. In addition, portions of the splitter 20 defining the front and rear ends of the second slot 20b engages the engaging recesses 47a and 46a of the front and rear engaging rollers 47 and 46. Further, the engaging projection 48a of the intermediate engaging roller 48 contacts the engaging recess 46a of the rear engaging roller 46 to thereby press the rear engaging roller 47 against the portion of the splitter 20 defining the rear end of the second slot 20b and to press the front engaging roller 47 against the portion of the splitter 20 defining the front end of the second slot 20b by a reaction force. As the front and rear engaging rollers 47 and 46 are pressed against the portions of the splitter 20 defining the front and rear ends of the second slot 20b, the engaging recesses 47a and 46a of the front and rear engaging rollers 47 and 46 are reliably held to be engaged with the portions of the splitter 20 defining the front and rear ends of the second slot 20b. Therefore, the front and rear engaging rollers 47 and 46 are reliably held in position relative to the splitter 20 with respect to the direction parallel to the surface of the splitter 20 and also with respect to the direction substantially perpendicular to the surface of the splitter 20. This may reliably hold the mounted state of the mount frame 30 and eventually the mounted state of the guard device 50 and the kickback preventing claw members 60 to the splitter 20.

In order to remove the mount mechanism 40 from the splitter 20, the operator may pivot the lever 41 upward to move the rear engaging roller 46 toward the front engaging roller 47 until the distance between the front side portion of the front engaging roller 47 and the rear side portion of the rear engaging roller 46 becomes smaller than the width L1. Then, the front and rear engaging rollers 47 and 46 can be moved from the second slot 20b to the first slot 20a and further to the outside of the splitter 20. Therefore, the mount mechanism 40 can be removed from the splitter 20. Removing the mount mechanism 40 from the splitter 20 can also result in the removal of the mount frame 30, guard device 50 and the kickback preventing claw members 60 from the splitter 20.

In this way, the mount mechanism 40 enables the mount frame 30, the guard device 50 and the kickback preventing claw members 60 to be reliably mounted to and removed from the splitter 20 by a simple vertical pivoting operation of the lever 41.

As shown in FIG. 11, two bushes 49 are rotatably supported on the fixed shaft 42 of the mount mechanism 40. The front engaging roller 47 is positioned between these two bushes 49. Thus, the kickback preventing claw members 60 can be vertically pivotally supported by the fixed shaft 42 via the respective bushes 49. Torsion springs 62 are fitted on the respective bushes 49. One end of each torsion spring 62 engages the top part 30a of the mount frame 30 and the other end of each torsion spring 62 engages the corresponding kickback preventing claw member 60 from its upper side. Therefore, the torsion springs 62 serve to normally urge the kickback preventing claw members 60 downward.

Figure 12:
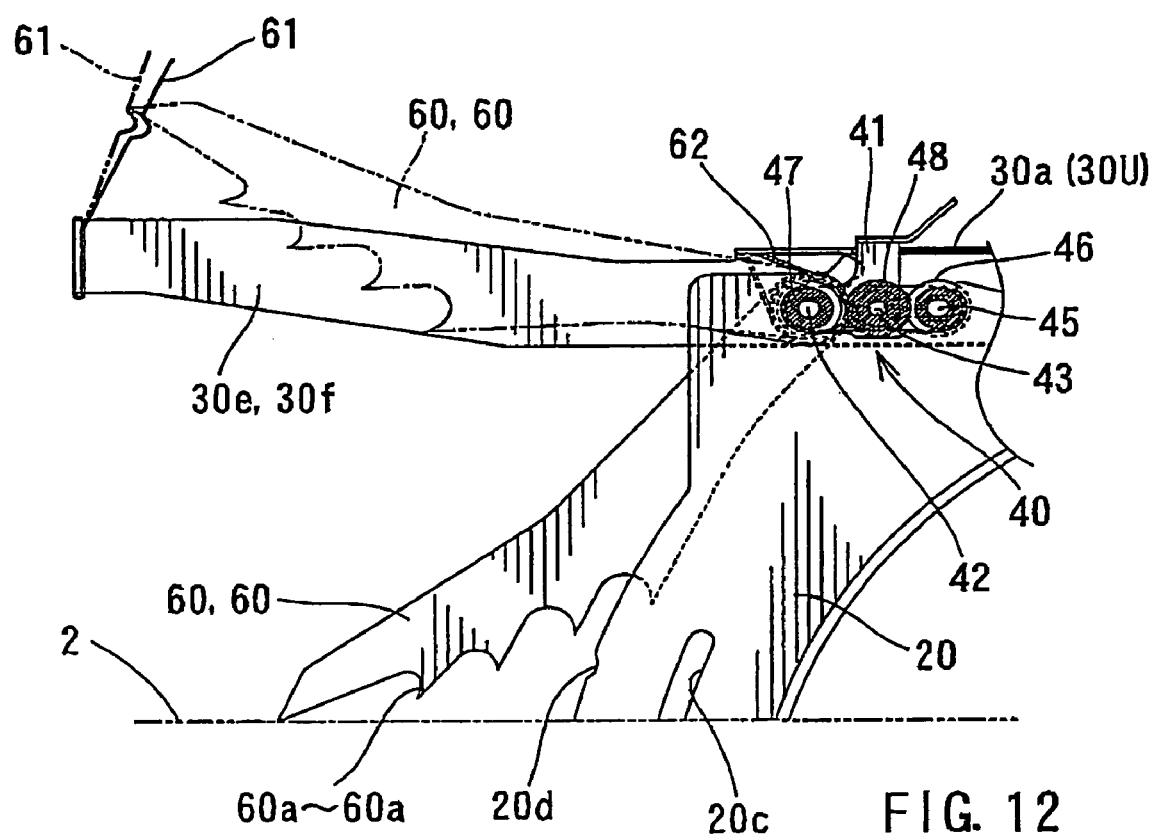
FIG. 12 is a side view of the mount mechanism and also showing kickback preventing claw members.

The kickback preventing claw members 60 can be disposed on laterally opposite sides of the saw blade 3 and each can include claws 60a at its lower side as shown in FIG. 12 for engaging the workpiece W. With the workpiece W pressed downward against the surface of the table 2 by the claws 60a of the kickback preventing claw members 60, the workpiece W may be prevented from being accidentally lifted due to the kickback phenomenon that may be caused by the force applied to the workpiece W by the rotating saw blade 3. Claws 60a can include other configurations as long as it provides favorable interaction with the workpiece W.

As described previously, the left and right protection arms 30e and 30f extend forwardly from the left and right side parts 30b and 30c of the inverted U-shaped portion 30U of the mount frame 30. As shown in FIG. 3, two claw holding springs 61 can be mounted between the front ends of the protection arms 30e and 30f.

By engaging the front ends of the kickback preventing claw members 60 with the claw holding springs 61 after pivoting the kickback preventing claw members 60 upward against the biasing forces of the torsion springs 62, it is possible to hold the kickback preventing claw members 60 at an upward rest position. At the rest position, the kickback preventing claw members 60 are positioned to extend substantially along the respective protection arms 30e and 30f. Therefore, the laterally outer sides of the kickback preventing claw members 60 can be covered by the respective protection arms 30e and 30f, so that other structural members can be reliably prevented from accidental interference with the kickback preventing claw members 60.

Figure 13:
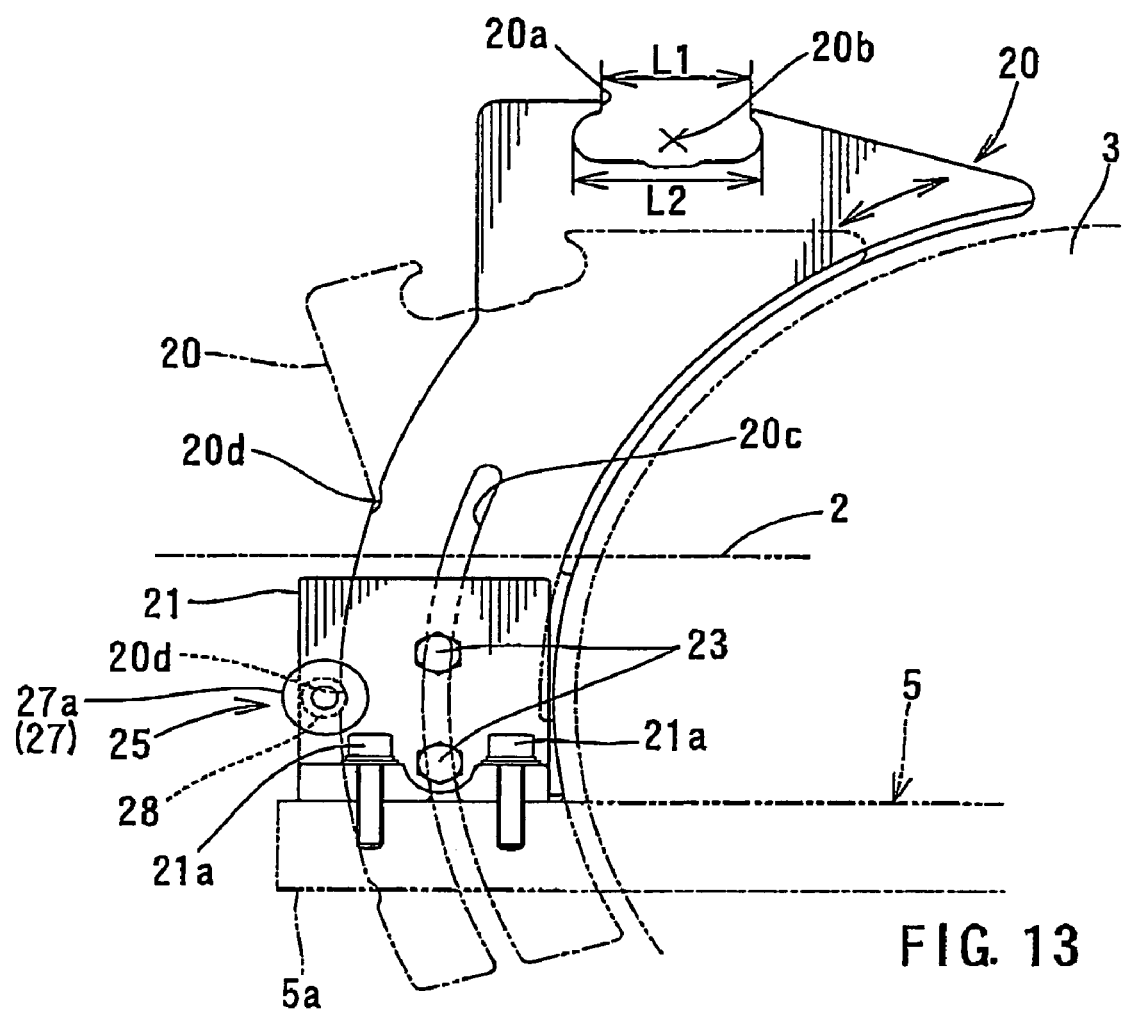
FIG. 13 is a side view of the splitter and showing the state where the mount frame has been removed from the splitter.
Figure 14:
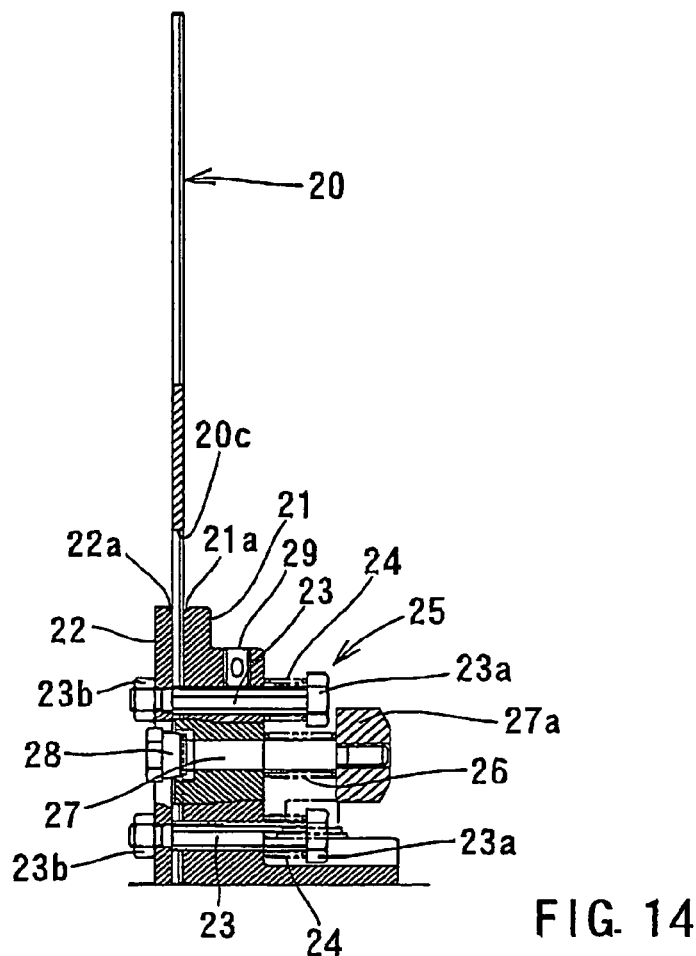
FIG. 14 is a vertical sectional view showing a mount base and the splitter mounted thereto.
Figure 15:
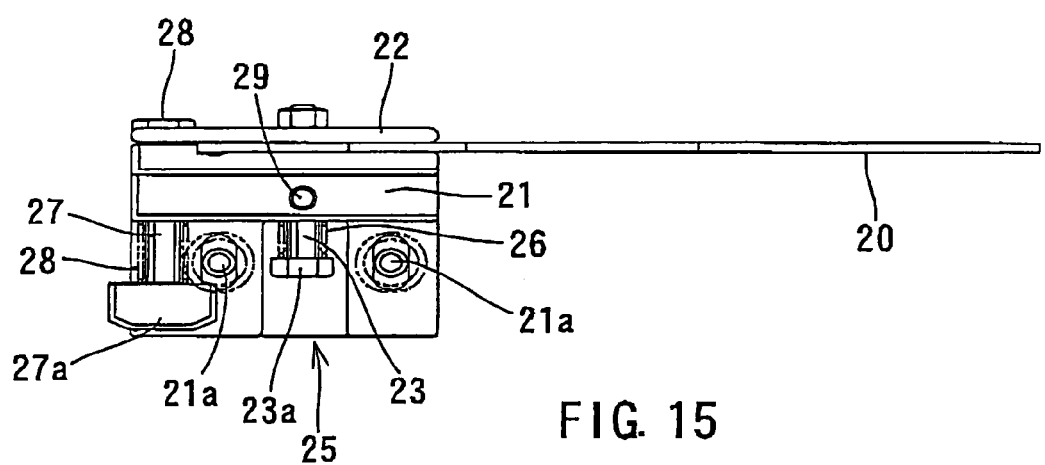
FIG. 15 is a plan view showing the mount base and the splitter.

As described previously, the splitter 20 can be mounted on the base portion 5a of the lift base 5 via the mount base 25. The base portion 5a extends forwardly from the lift base 5 as shown in FIG. 1. The details of the mount base 25 are shown in FIGS. 13 and 14. The mount base 25 can include a fixed base 21 and a clamp plate 22. The fixed base 21 is fixedly mounted on the base portion 5a of the lift base 5 via bolts 21a. The clamp plate 22 is adapted to clamp the lower portion of the splitter 20 in the direction of its thickness against the fixed base 21.

Upper and lower support shafts 23 extend between the fixed base 21 and the clamp plate 22. The support shafts 23 have stepped portions for engaging the clamp plate 22. Nuts 23b engage with the support shafts 23 from the side opposite to the stepped portions with respect to the clamp plate 22, so that the support shafts 23 are fixed in position by the tightening forces applied to the nuts 23b. Compression springs 24 are interposed between heads 23a of the support shafts 23 and the fixed base 21, so that the compression springs 24 bias the clamp plate 22 in a direction toward the fixed base 21 or the direction for clamping the splitter 20. A fixing screw 29 fixes one of the support shafts 23 in position relative to the clamp plate 22, so that the clamp plate 22 can be fixed in position relative to the fixed base 21.

As shown in FIGS. 12 to 14, an elongated mount slot 20c can be formed in the lower portion of the splitter 20 and is opened at the lower edge of the splitter 20. Preferably, the mount slot 20c extends along an arc about the rotational axis of the saw blade 3. The support shafts 23 are inserted into the mount slot 20c.

As shown in FIG. 13, a plurality of substantially semicircular recesses 20d can be formed in the front edge of the splitter 20. Two semicircular recesses 20d can be included in this embodiment. The fixed base 21 has a fixing shaft 27 that extends throughout the thickness of the fixed base 21. A compression spring 26 is interposed between a head 27a of the fixing shaft 27 and the fixed base 21 in order to bias the fixing shaft 27 in the right direction as viewed in FIG. 14. A fixing block 28 having a substantially truncated conical configuration is attached to the left end of the fixing shaft 27 and is engageable with any one of the semicircular recesses 20d in order to fix the splitter 20 in position relative to the mount base 25 through cooperation with the support shafts 23.

The clearance between the clamp plate 22 and the fixed base 21 can be adjusted by the following process. First, the fixing screw 29 is loosened, so that the clamp plate 22 is biased toward the fixed base 21 by the compression springs 24. The clamp plate 22 therefore contacts with the fixed base 21. Then, the splitter 20 is inserted between the clamp plate 22 and the fixed base 21 from the upper side. In order to facilitate the inserting operation, an upper corner portion 21a of the fixed base 21 and an upper corner portion 22a of the clamp plate 22, which can be oppose to each other, are chamfered. Therefore, so that the splitter 20 can be wedged between the fixed base 21 and the clamp plate 22 under the guide of the chamfered upper corner portions 21a and 22a. As a result, the fixed base 21 and the clamp plate 22 can be spaced from each other by the distance corresponding to the thickness of the splitter 20. Then, the fixing screw 29 is tightened to fix the clamp plate 22 in position relative to the fixed base 21, so that the clearance between the fixed base 21 and the clamp plate 22 may be maintained. In this state, the support shaft 23 that is disposed on the lower side as viewed in FIG. 14 is not fixed in position relative to the fixed base 21. However, the compression spring 24 associated with the lower support shaft 23 does not act to move the clamp plate 22, because the fixed base 21 and the clamp plate 22 are fixed in position by the fixing screw 29 associated with the upper support shaft 23.

Because the clearance between the clamp plate 22 and the fixed base 21 can be set and fixed to correspond to the thickness of the splitter 20 to be used, potential movement in the direction of thickness of the splitter 20 is reduced while the adjustment of vertical position of the splitter 20 along the mount slot 20c may be possible. The same setting process can be applied to different splitters having different thicknesses.

In order to set the splitter 20, the operator can insert the lower portion of the splitter 20 into the clearance between the clamp plate 22 and the fixed base 21 such that the support shafts 23 enter the mount slot 20c. When the splitter 20 has been moved in such a position that any one of the fixing recess 20d of the splitter 20 opposes the fixing block 28 of the fixing shaft 27, the fixing block 28 can engage with the fixing recess 20d due to the biasing force of the compression spring 26. As a result, the splitter 20 can be fixed in position with respect to both the direction perpendicular to the thickness of the splitter 20 and the direction parallel to the surface of the splitter 20.

In order to change the vertical position of the splitter 20, the operator may push the head 27a of the fixing shaft 27 against the biasing force of the compression spring 26, so that the fixing block 28 may be disengaged from the fixing recess 20d. Then, the operator vertically moves the splitter 20 to a position where the fixing block 28 opposes to another fixing recess 20d. This movement can be easily made, because no substantial clamping force is applied to the splitter 20. Thereafter, the operator may release the pushing force applied to the fixing shaft 27, so that the fixing block 28 engages the fixing recess 20d by the biasing force of the spring 26. As a result, the splitter 20 can be again fixed in position with respect to both the direction perpendicular to the thickness of the splitter 20 and the direction parallel to the surface of the splitter 20.

In order to remove the splitter 20, the operator also can push the head 27a of the fixing shaft 27 for disengaging the fixing block 28 from the fixing recess 20d. Then, the operator may simply lift the splitter 20 for disengaging the mount slot 20c from the support shafts 23.

According to the one embodiment of the present invention as described above, the mount flame 30 can be removed from the upper portion of the splitter 20 by upwardly pivoting the lever 41 of the mount mechanism 40. Because the guard device 50 and the kickback preventing claw members 60 are mounted to the mount frame 30, the guard device 50 and the kickback preventing claw members 60 can be removed from the splitter 20 together with the mount frame 30 by simply pivoting the lever 41. Therefore, the difficulty in removing the mount frame 30, the guard device 50 and the kickback preventing claw members 60 can be considerably reduced in comparison with the operations for removing these elements from the splitter 20 separately from each other.

In addition, mounting the mount frame 30 to the splitter 20 also attaches the guard device 50 and the kickback preventing claw members 60 to the splitter 20. Therefore, the difficulty in mounting the mount frame 30, the guard device 50 and the kickback preventing claw members 60 can be considerably reduced in comparison with the operations for mounting these elements to the splitter 20 separately from each other.

Further, downwardly pressing the operation lever portion 51a may enable the mount holder 51 to be removed from the tubular portion 30T of the mount frame 30 and to eventually remove the guard device 50 from the mount frame 30. Therefore, it is possible to remove the guard device 50 from the splitter 20 while the kickback preventing claw members 60 being held to be mounted to the splitter 20. This may improve the operability in removing the saw blade 3 and in performing the maintenance work. On the contrary, inserting the mount holder 51 into the tubular portion 30T of the mount frame 30 can mount the guard device 50 to the mount frame 30. Therefore, the guard device 50 can be easily mounted to the splitter 20. The operability in performing maintenance work on the cutting device 1 can be improved.

Furthermore, because the mount frame 30 can be mounted to and removed from the splitter 20 by simply vertically pivoting the lever 41 of the mount mechanism 40, the guard device 50 and the kickback preventing claw members 60 can be easily mounted to and removed from the splitter 20 without utilizing special tools.

Still furthermore, the mount base 25 can be used for mounting various splitters having different thicknesses to the lift base 5. Additionally, the splitter 20 can be removed by simply pushing the fixing shaft 27 of the mount base 25. Therefore, it is possible to replace the splitter 20 to change the vertical position of the splitter 20 without using special tools.

Furthermore, the kickback preventing claw members 60 can be held in the upper rest position by the claw holding springs 61. The kickback preventing claw members 60 can be returned from the rest position to the kickback preventing position by downwardly pivoting the kickback preventing claw members 60 after disengaging from the claw holding springs 61. Therefore, the operability of the kickback preventing claw members 60 can be further improved.

In the rest position, the kickback preventing claw members 60 extend between and along the protection arms 30. Therefore, it is possible to reliably prevent the other articles, such as hand-held tools, from being interfered by the kickback preventing claw members 60.

The above embodiments may be modified in various ways. For example, when the mount holder 51 is inserted into the tubular portion 30T of the mount frame 30, the removal preventing stop 51b engages the stop hole 30g, so that the mount holder 51 is held in the mounted position, and eventually, the guard device 50 can be mounted to the mount frame 30. However, screws may be used for removably attaching the mount holder 51 to the tubular portion 30T of the mount frame 30. In such a case, the lever 51a and the removal preventing stop 51b may be omitted.

Additionally, the mount holder 51, the guard frame 52 and the guard holder 53 may be formed integrally with each other. One example to accomplish this is by using a molding process including synthetic resin.

Although the tubular portion 30T of the mount frame 30 has a rectangular cross section in the above embodiments, the tubular portion 30T may have different cross sectional configurations, such as circular and triangular cross sections. In addition, the tubular portion 30T may be replaced with a non-tubular portion, if the mount holder 51 is removably attached to the tubular portion 30T by screws as noted previously.

The mount mechanism 40 may be replaced with any other mount mechanisms. For example, the mount frame 30 may be removably mounted to the upper proton of the splitter 20 by using bolts that clamp the splitter 20 from opposite sides with respect to the thickness direction. In such a case, the first and second slots 20a and 20b of the splitter 20 can be eliminated.

Further, although the mount base 25 is configured to enable the splitter 20 to be mounted and removed by the pushing and releasing operations of the fixing shaft 27, this mounting construction can be replaced with different constructions. For example, the splitter 20 may be clamped between the clamp plate 22 and the fixed base 21 by means of bolts. In such a case, the support shafts 23, the fixing shaft 27 and their associated parts can be eliminated.

What is claimed is:

1. A cutting device comprising:
a table for placing a workpiece thereon;
a saw blade protruding from an upper surface of the table;
a splitter positioned in alignment with the saw blade;
a guard device arranged and constructed to cover the saw blade;
a kickback preventing claw member arranged and constructed to prevent the workpiece from being forced upward by the saw blade after the workpiece has been cut by the saw blade; and
a mount frame detachably mounted to an upper portion of the splitter;
wherein the guard device and the kickback preventing claw member are supported on the mount frame,
the guard device is removable from the mount; frame,
the kickback preventing claw member is vertically pivotally supported by the mount frame and is pivotable between a lower kickback preventing position and an upper rest position, when the kick back preventing claw member is at the lower kickback preventing position, the kickback preventing claw member contacts with a workpiece placed on the table, when the kick back preventing claw member is at the upper rest position, the kickback preventing claw member does not contact with a workpiece placed on the table, a claw holding device constructed to be able to hold the kickback preventing claw member at the upper rest position, wherein the mount frame comprises a pair of parallel protection arms extending forwardly from the mount frame with respect to the cutting direction, the kickback preventing claw member has a first end pivotally joined to the protection arms and a second end opposite to the first end, the second end being configured as a free end and having at least one claw that contacts with the workpiece placed on the table, the kickback preventing claw member extends along and between the protection arms when the kickback preventing claw member is positioned in the upper rest position, and the claw holding device engages the second end of the kickback preventing claw member for preventing the kickback preventing claw member from moving from the rest position toward the kickback preventing position.

2. The cutting device as in claim 1, wherein the claw holding device comprises a claw holding spring for resiliently holding the kickback preventing claw member at the upper rest position.

3. The cutting device as in claim 1, wherein the guard device can be removed from the mount frame independently of the kickback preventing claw member.

4. The cutting device as in claim 1, wherein:

the mount frame comprises a tubular portion with an opening on a rear side with respect to the cutting direction, further wherein the guard device comprises a mount holder removably insertable into the tubular portion, a guard frame extending rearward from the mount holder with respect to the cutting direction, a guard holder disposed at one end of the guard frame, and a guard plate vertically pivotally supported on the guard holder.

5. A cutting device comprising:

a table for placing a workpiece thereon;

a saw blade protruding from an upper surface of the table;

a splitter positioned in alignment with the saw blade;

a guard device arranged and constructed to cover the saw blade;

a kickback preventing claw member arranged and constructed to prevent the workpiece from being forced upward by the saw blade after the workpiece has been cut by the saw blade; and a mount frame detachably mounted to an upper portion of the splitter;

wherein the guard device and the kickback preventing claw member are supported on the mount frame, the guard device as removable from the mount frame, and the kickback preventing claw member is vertically pivotally supported by the mount frame and is pivotable between a lower kickback preventing position and an upper rest position; and a claw holding device constructed to be able to hold the kickback preventing claw member at the upper rest position, wherein the splitter includes a first slot starting from an upper edge of the splitter and having a first width, and a second slot formed in continuity with the first slot and having a second width greater than the first width, further wherein:

the mount frame includes a mount mechanism for mounting the mount frame to an upper portion of the splitter;

the mount mechanism comprises:

a lever vertically pivotally supported by the mount frame via a fixed shaft;

an arm having a first end and a second end, the first end being pivotally joined to the lever;

a shiftable shaft coupled to the second end of the arm and movably supported by the mount frame, so that the shiftable shaft moves in forward and rearward directions as the arm pivots by the vertical pivotal operation of the lever;

a first engaging roller rotatably supported on the fixed shaft;

a second engaging roller rotatably supported on the shiftable shaft, so that the second engaging roller moves toward and away from the first engaging roller as the lever is pivoted between a first position and a second position;

wherein the first and second engaging rollers are spaced from each other by a first distance when the lever has been pivoted to the first position, the first and second engaging rollers are spaced from each other by a second distance when the lever has been pivoted to the second position, the first distance permitting the first and second engaging rollers to move into and out of the second slot via the first slot of the splitter when the lever has been pivoted to the first position, and the second distance enabling engagement of the first and second rollers with opposite ends of the second slot of the splitter when the lever has been pivoted to the second position, while the second distance preventing the first and second engaging rollers from moving from the second slot to the first slot.

6. The cutting device as in claim 1, further comprising:

a lift base supporting the saw blade and vertically movable relative to the table;

wherein the splitter is mounted to the lift base via a mount base, so that the splitter can move vertically together with the saw blade;

wherein the mount base comprises:

a fixed base fixedly mounted to the lift base, a clamp plate arranged and constructed to clamp the splitter against the fixed base; and a biasing member arranged and constructed to bias the clamp plate toward the fixed base.

7. The cutting device as in claim 1, wherein the holding device detachably engages the second end of the kickback preventing claw member.

8. The cutting device as in claim 2, wherein the claw holding spring is mounted to the protection arms and detachably engages the second end of the kickback preventing claw member.

* * * * *